United States Patent
Thomason (10) Patent No.: US 7,185,273 B2
(45) Date of Patent: Feb. 27, 2007

(54) SYSTEM AND METHOD FOR COMPLETING FORMS

(75) Inventor: Tamra L. Thomason, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1024 days.

(21) Appl. No.: 09/916,537

(22) Filed: Jul. 27, 2001

(65) Prior Publication Data

US 2003/0023625 A1 Jan. 30, 2003

(51) Int. Cl.
G06F 17/21 (2006.01)

(52) U.S. Cl. .................. 715/508; 715/507; 715/505

(58) Field of Classification Search .......... 715/505, 715/507; 707/9, 10; 235/380; 713/201, 713/155; 709/227; 395/202, 146
See application file for complete search history.

(56) References Cited

U.S. PATENT DOCUMENTS

| | | | | |
|---|---|---|---|---|
| 4,385,285 A * | 5/1983 | Horst et al. | ............ | 382/119 |
| 5,450,537 A * | 9/1995 | Hirai et al. | ............ | 715/507 |
| 5,479,530 A * | 12/1995 | Nair et al. | ............ | 382/119 |
| 5,640,577 A * | 6/1997 | Scharmer | ............ | 715/507 |
| 5,724,520 A * | 3/1998 | Goheen | ............ | 705/5 |
| 5,852,977 A * | 12/1998 | Lynch | ............ | 101/232 |
| 5,987,612 A * | 11/1999 | Takagawa et al. | ............ | 713/201 |
| 6,088,700 A * | 7/2000 | Larsen et al. | ............ | 707/10 |
| 6,112,986 A * | 9/2000 | Berger et al. | ............ | 235/380 |
| 6,378,070 B1 * | 4/2002 | Chan et al. | ............ | 713/155 |
| 6,385,651 B2 * | 5/2002 | Dancs et al. | ............ | 709/227 |
| 6,490,601 B1 * | 12/2002 | Markus et al. | ............ | 715/507 |
| 6,651,060 B1 * | 11/2003 | Harper et al. | ............ | 707/9 |
| 6,651,217 B1 * | 11/2003 | Kennedy et al. | ............ | 715/507 |
| 6,662,340 B2 * | 12/2003 | Rawat et al. | ............ | 715/507 |

* cited by examiner

Primary Examiner—Heather R. Herndon
Assistant Examiner—Gautam Sain (57) ABSTRACT

The present disclosure relates to a method for completing forms. In one arrangement, the method comprises the steps of receiving location information for user information to be added to a form, retrieving the user information, configuring the user information for merging with the form, and printing a form that contains at least a portion of the user information. This method can be practice, for example, through use of a printing device comprising printing hardware with which hardcopy documents can be generated, a card reader that is adapted to read data from a user data card, a network interface device that is adapted to transmit and receive data via a network, and device memory that stores forms data.

17 Claims, 7 Drawing Sheets

SYSTEM AND METHOD FOR COMPLETING FORMS

FIELD OF THE INVENTION

The present disclosure relates to a system and method for completing forms. More particularly, the disclosure relates to a system and method with which forms can be, at least partially, automatically completed.

BACKGROUND OF THE INVENTION

Persons are frequently called upon to complete forms to provide personal information. For instance, when a patient visits his or her doctor, the patient is often required to complete one or more forms that, for example, identify the person's name, sex, date of birth, social security number, address, telephone number(s), marital status, insurance carrier, insurance subscriber name, insurance group number, applicable medical conditions, current prescriptions, allergies, etc. In another example, a person may be called upon to complete an application form for a potential employer which identifies, for instance, the person's name, sex, date of birth, social security number, address, telephone number(s), employment history, physical disabilities, etc.

As can be appreciated from the two examples cited above, much of the information a person may be required to provide is the same regardless of the recipient of the information. Accordingly, the person may be required to provide the same information repeatedly to different recipients and, in some circumstances, to the same recipients on different occasions. In addition to the tedium involved with repeatedly filling out such forms, the person may not have all of the information called for by the form. For instance, information such as an insurance group number may only be used by the person a few times a year and therefore may not be committed to memory.

From the foregoing, it can be appreciated that it would be desirable to have a system and method for completing forms in which a form can be, at least partially, automatically completed to reduce the amount of information the user must manually provide on the form.

SUMMARY OF THE INVENTION

The present disclosure relates to a method for completing forms. In one arrangement, the method comprises the steps of receiving location information for user information to be added to a form, retrieving the user information, configuring the user information for merging with the form, and printing a form that contains at least a portion of the user information.

The present disclosure further relates to a system for completing forms. In one arrangement, the system comprises means for receiving location information for user information, means for retrieving the user information, means for configuring the user information for merging with a form, and means for printing a form that contains at least a portion of the user information.

Other systems, methods, features, and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
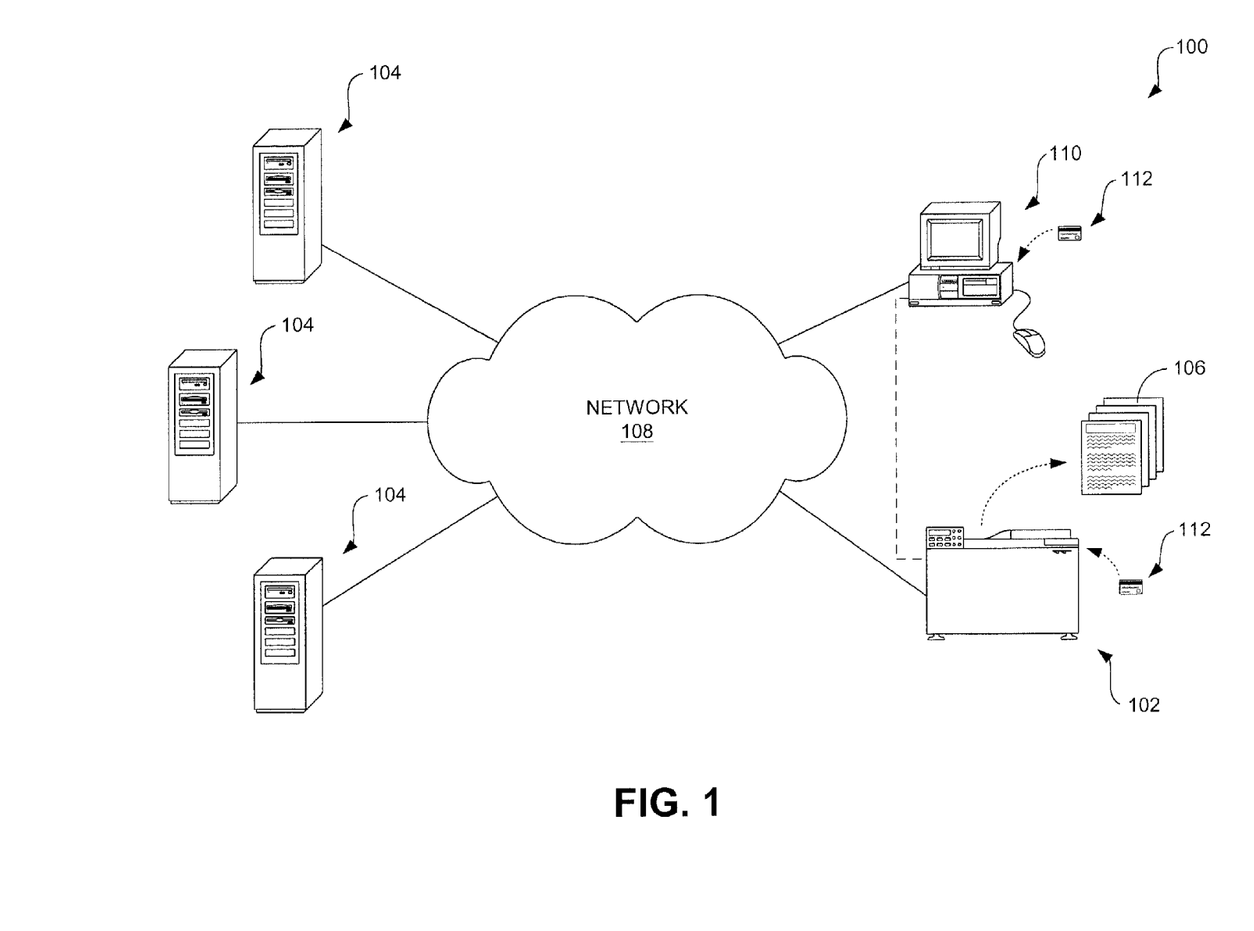
FIG. 1 is a schematic view of a system for completing forms.

Referring now in more detail to the drawings, in which like numerals indicate corresponding parts throughout the several views, FIG. 1 illustrates a system 100 for completing forms. Although the term "completing" is used, it will be understood from the discussion that follows that forms need not be "completed" by the system and method in the absolute sense. Instead, it will be appreciated that the disclosed system and method are used to at least partially fill-in forms.

As indicated in FIG. 1, the system 100 generally comprises a printing device 102 and one or more remote computing devices 104. The printing device 102 is capable of outputting hardcopy documents 106 such as forms. By way of example, the printing device 102 can comprise a printer, facsimile machine, multi-functional peripheral (MFP) device, or other such printing device. The remote computing devices 104 can comprise substantially any device that stores data and which can communicate with other devices via a network. For instance, the remote computing devices 104 comprise personal computers (PCs) and/or servers.

The printing device 102 and the remote computing devices 104 are connected to a network 108 that can comprise one or more sub-networks that are communicatively coupled to each other. By way of example, these networks can include one or more local area networks (LANS) and/or wide area networks (WANs). Typically, however, the network 108 at least comprises a set of networks that forms part of the Internet. In addition, the system 100 can include a local computing device 110 that is also connected to the network 108. As depicted in dashed lines, the local computing device 110 can, optionally, be directly connected the printing device 102, if desired.

Further indicated in FIG. 1 is one or more data cards 112 that can be read by the printing device 102 and/or the local computing device 110. Each data card 112 comprises a data storage medium (not identified) with which information pertinent to the card holder (i.e., user) is stored. In one arrangement, the data card 112 is similar in configuration to a automated teller machine (ATM) card and therefore comprises a magnetic strip that stores data. When configured in this manner, a passcode can, optionally, be required to access data stored on the data card 112, as is described in greater detail below. The data card 112 can alternatively comprise a memory chip or other memory device which stores the data.

Figure 2:
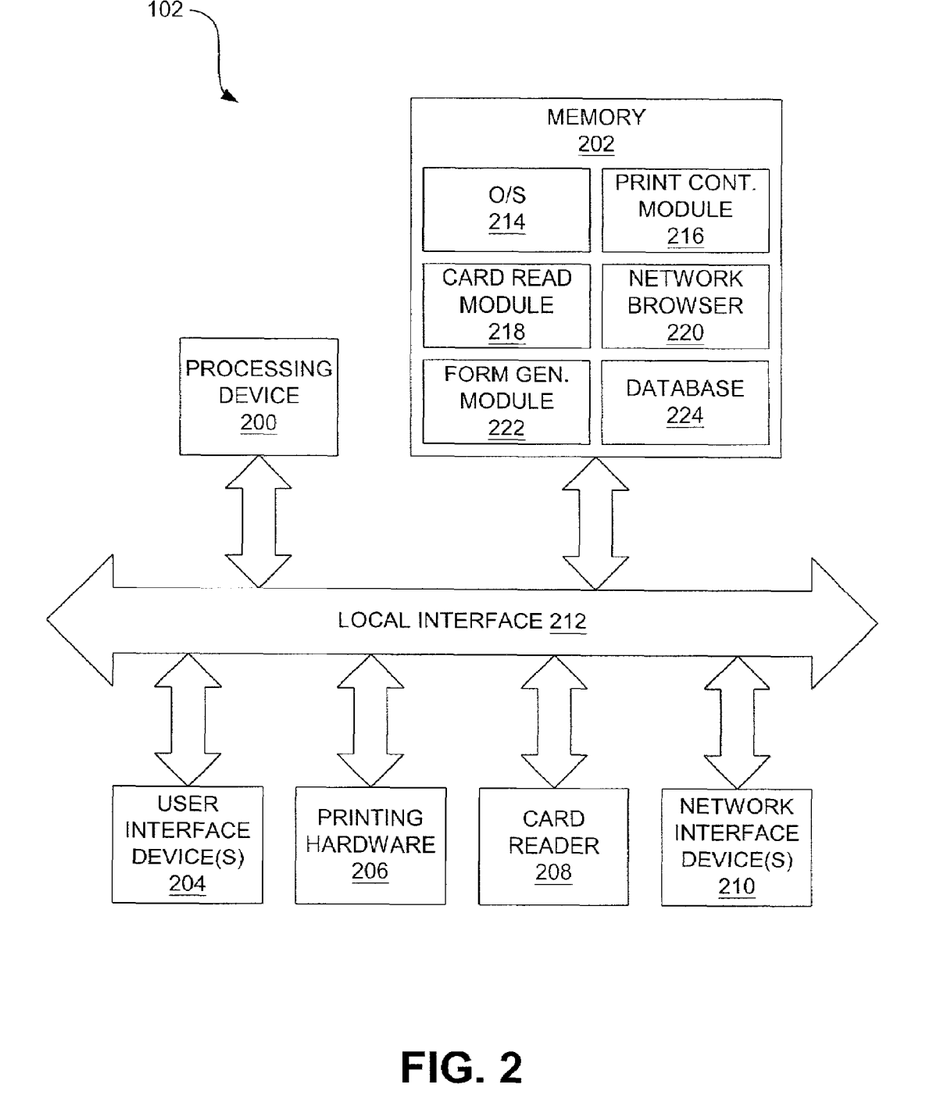
FIG. 2 is a schematic view of a printing device shown in FIG. 1.

FIG. 2 is a schematic view illustrating an example architecture for the printing device 102 shown in FIG. 1. As indicated in FIG. 2, the printing device 102 can comprise a processing device 200, memory 202, one or more user interface devices 204, printing hardware 206, a card reader 208, and one or more network interface devices 210. Each of these components is connected to a local interface 212 that, by way of example, comprises one or more internal buses. The processing device 200 is adapted to execute commands stored in memory 202 and can comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the printing device 102. The one or more user interface devices 204 typically comprise interface tools with which the device settings can be changed and through which the user can communicate commands to the printing device 102. By way of example, the user interface devices 204 comprise one or more function keys with which the operation of the printing device 102 can be controlled and a display, such as a liquid crystal display (LCD) or plasma display, with which information can be visually communicated to the user and, where the display comprises a touch-sensitive screen, commands can be entered.

The printing hardware 206 comprises the components with which the printing device 102 generates hardcopy documents. By way of example, the printing hardware 206 comprises electrophotographic imaging components such as a charge roller, photoconductor drum, laser scanner, developing roller, fusing system, and print medium conveyance mechanism. The card reader 208 can be integrated with the printing device 102 or can merely be communicatively coupled to the device. In either case, the card reader 208 comprises hardware with which information can be read from the data card 112. By way of example, the card reader 208 can be adapted to read information from a magnetic strip of the data card 112 when the card comprises a magnetic strip. Alternatively, where the storage medium of the data card 112 comprises a memory chip or other memory device, the card reader 208 can be adapted to read information from the memory chip or other memory device. The one or more network interface devices 210 are adapted to facilitate connection to the network 108 and can include components that communicate both inputs and outputs, for instance, a modulator/demodulator (e.g., modem), a radio frequency (RF) or other transceiver, a telephonic interface, a bridge, a router, etc.

The memory 202 includes various software and/or firmware programs including an operating system 214, print control module 216, a card read module 218, a network browser 220, and a form generation module 222. The operating system 214 contains the various commands used to control the general operation of the printing device 102. The print control module 216 comprises software and/or firmware that controls the operation of the printing hardware 206 and therefore facilitates the output of hardcopy documents from the printing device 102. The card read module 218 comprises software and/or firmware that controls operation of the card reader 208 such that information stored on the data card 112 can be collected and manipulated as required.

The network browser 220 comprises software and/or firmware that, in conjunction with the network interface devices 210, is used to access the network 108 and, as is described below, retrieve information from other devices connected to the network. Finally, the form generation module 222 comprises software and/or firmware that controls the completion of forms through use of the information collected from the other devices via the network 108. The operation of the form generation module 222 is described in detail with reference to FIG. 5 below. In addition to these programs, the memory 202 can further include a database 224 that stores forms data (e.g., documents comprising a plurality of data fields) and information that has been collected with the network browser 220.

Figure 3:
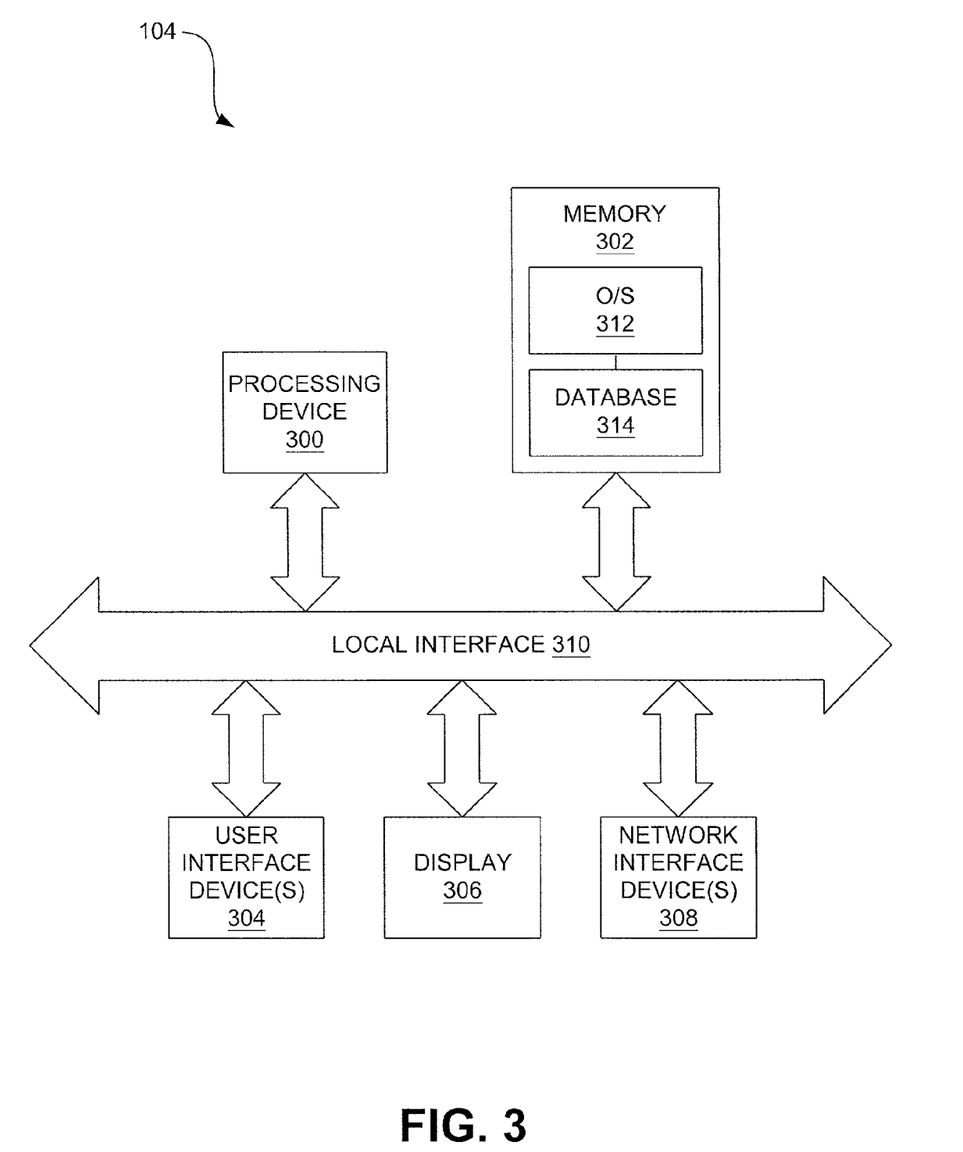
FIG. 3 is a schematic view of a remote computing device shown in FIG. 1.

FIG. 3 is a schematic view illustrating an example architecture for the remote computing devices 104 shown in FIG. 1. As indicated in FIG. 3, each remote computing device 104 can comprise a processing device 300, memory 302, one or more user interface devices 304, a display 306, and one or more network interface devices 308, each of which are connected to a local interface 310. The processing device 300 can include any custom made or commercially available processor, a central processing unit (CPU) or an auxiliary processor among several processors associated with the remote computing device 104, a semiconductor based microprocessor (in the form of a microchip), or a macroprocessor. The memory 302 can include any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 304 comprise those components with which commands are communicated to the remote computing device 104. By way of example, these components can comprise those typically used in conjunction with a PC such as a keyboard and mouse. Similarly, the display 306 can comprise a display typically used in conjunction with a PC such as a computer monitor. The one or more network interface devices 308, like network interface devices 210, comprise components that communicate both inputs and outputs, for instance, a modulator/demodulator (e.g., modem), a radio frequency (RF) or other transceiver, a telephonic interface, a bridge, a router, etc.

The memory 302 normally at least comprises an operating system 312 and a database 314. The operating system 312 controls the execution of other software, where provided, and provides scheduling, input-output control, file and data management, memory management, and communication control and related services. As described in greater detail below, the database 314 can be used to store user information that is accessed with the printing device 102 and/or local computing device 110 when the information is needed to complete a form. Although memory 302 is shown and described as only including an operating system and database, it will be appreciated that other components can be stored within memory. For instance, memory 302 can further include a program with which the user information can be entered and stored in the database 314 by an appropriate administrator.

Figure 4:
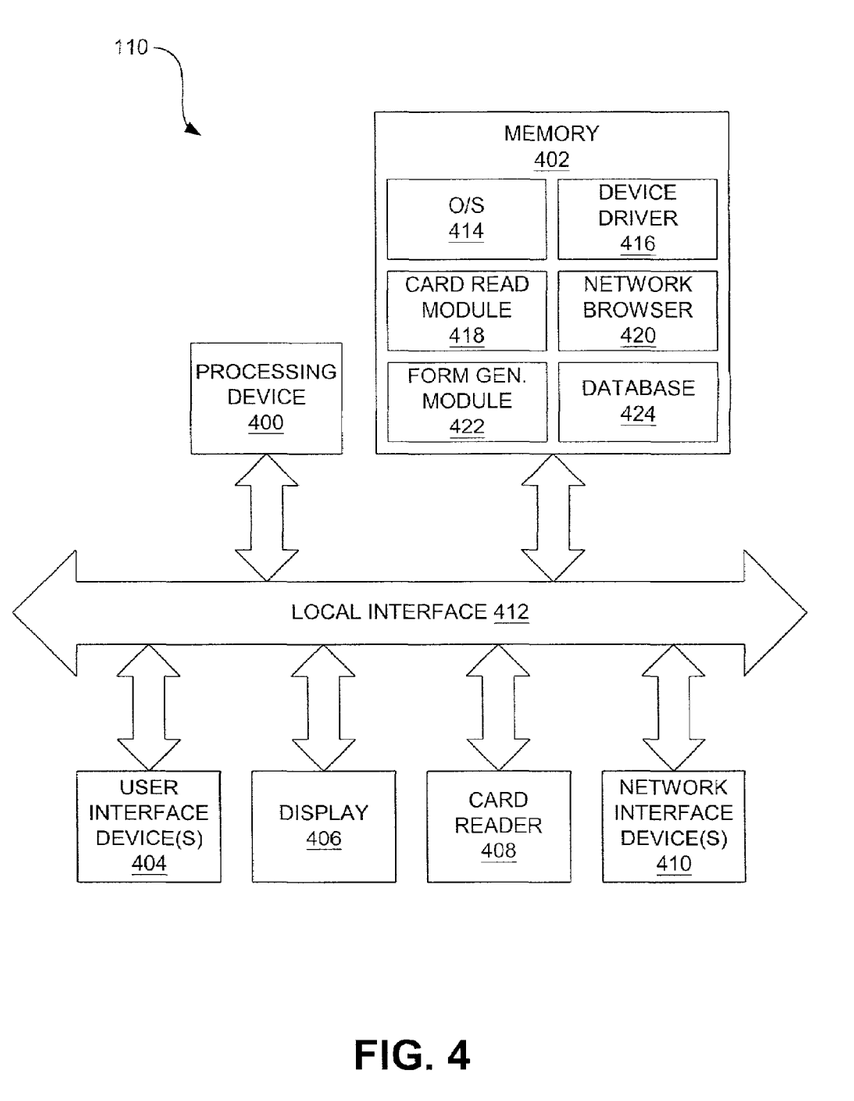
FIG. 4 is a schematic view of a local computing device shown in FIG. 1.

FIG. 4 is a schematic view illustrating an example architecture for the local computing device 110 shown in FIG. 1. As indicated in FIG. 4, the local computing device 110 can comprise many of the same components as the remote computing devices 104. Accordingly, the local computing device 110 typically comprises a processing device 400, memory 402, one or more user interface devices 404, a display 406, one or more network interface devices 410, and a local interface 412, each of which having similar configurations to like-named components described above in relation to FIG. 3. In addition, however, the local computing device 110 can, like the printing device 102, comprise a card reader 408 (integral or separate) that is adapted to read data stored on a data card 112. Furthermore, the memory 402 can include an operating system 414, device driver 416, a card read module 418, a network browser 420, and a form generation module 422.

The device driver 416 comprises the various software with which the local computing device 110 can communicate with and control operation of the printing device 102. The card read module 418, network browser 420, and form generation module 422 are used in similar manner to those of the printing device 102 to facilitate the completion and printing of forms. The operation of the form generation module 422 is discussed along with the discussion of the form generation module 222 in relation to FIG. 5. Like memory 202, memory 402 can further include a database 424 that stores forms data (e.g., documents comprising a plurality of data fields) and information that has been collected regarding the user.

Various software and/or firmware programs have been described herein. It is to be understood that these programs can be stored on any computer readable medium for use by or in connection with any computer related system or method. In the context of this document, a computer readable medium is an electronic, magnetic, optical, or other physical device or means that can contain or store a computer program for use by or in connection with a computer related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

An example system 100 having been described above, operation of the system will now be discussed. In the discussion that follows, flow diagrams are provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Figure 5:
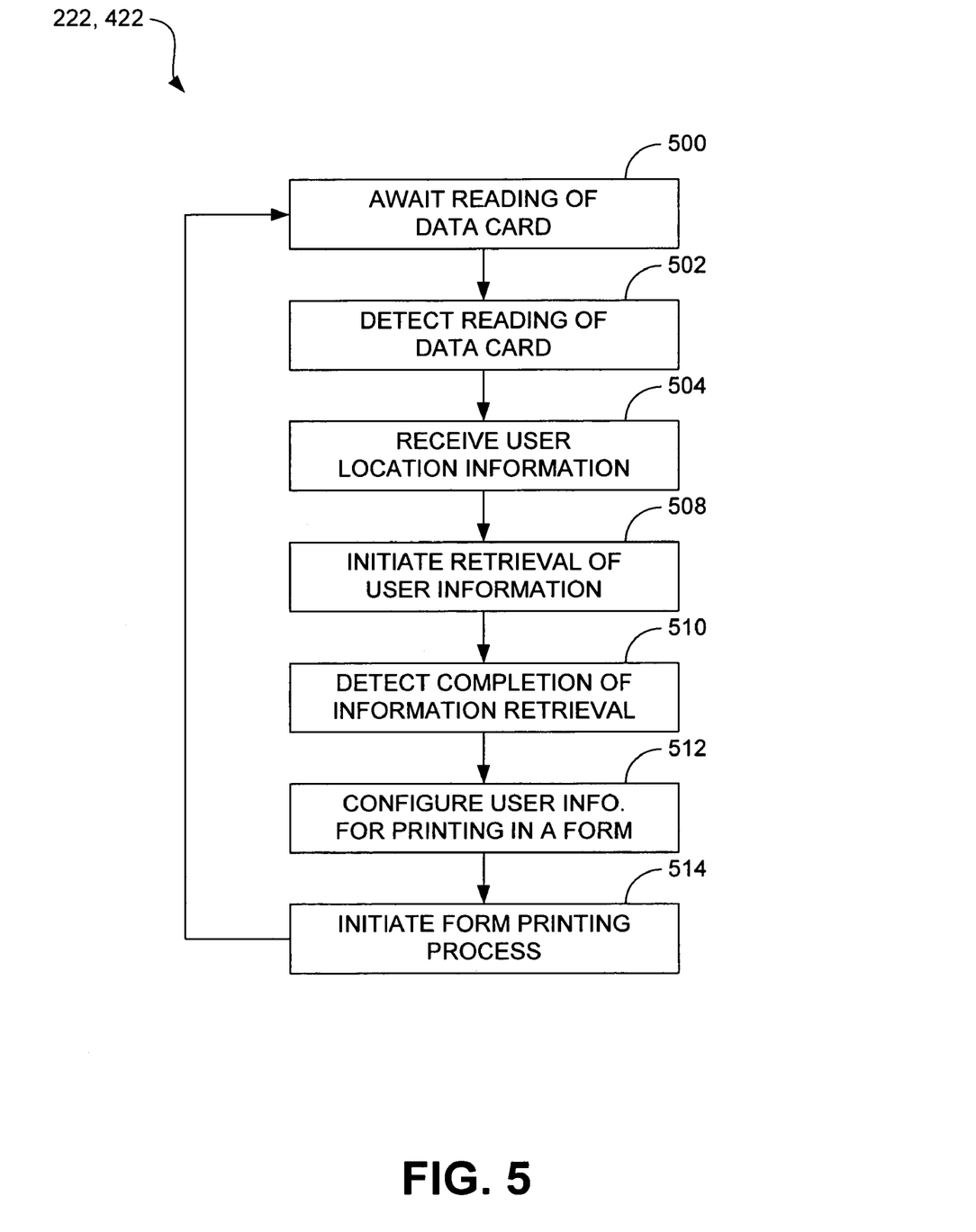
FIG. 5 is a flow diagram that illustrates an example mode of operation of form generation modules shown in FIGS. 2 and 4.

FIG. 5 illustrates the separate operation of the form generation module 222 of the printing device 102 and the form generation module 422 of the local computing device 110. The operation of these modules 222 and 422 is discussed together in reference to FIG. 5 because they operate in similar manner to achieve the same result. As indicated in block 500, the form generation module 222, 422 first awaits reading of a data card. This reading can occur, for example, in response to a user or other person inserting a data card 112 into the card reader 208 associated with the printing device 102 associated with the card reader 408 of the local computing device 110 as the case may be. Once the reading of a data card is detected, as indicated in block 502, the form generation module 222, 422 receives location information relevant to user information, as indicated in block 504, that will be used to, at least partially, complete one or more forms to be printed by the printing device 102. This location information can comprise an address, such as a universal resource locator (IJRL), that identifies where the information is stored on the network 108 50 that the printing device 102 or local computing device 110 can retrieve the information.

Once the location information has been received, the form generation module 222, 422 can initiate the retrieval of the user information as indicated in block 508. By way of example, this initiation can comprise the issuance of a command to the network browser 220 or 420 as the case may be. At this point, the user information can be retrieved by the network browser 220, 420. As noted above, the information can be stored within the database 314 of one or more of the remote computing devices 104. These remote computing devices 104 can be operated by a information repository service provider, an insurance company, the user, or substantially any other entity that may store information that is needed to fill out a form. Alternatively, the information can be stored locally in the database 424 of the local computing device 110. In the latter case, the network browser 420 is not implemented.

Once the user information is retrieved, the form generation module 222, 422 can detect completion of the retrieval process, as indicated in block 510, and, as indicated in block 512, configure the user information for addition to one or more forms. By way of example, configuring the information can comprise arranging the placement of the user information on the form based upon the data fields to which each piece of user information pertains. In other words, the form generation module 222, 422 can be configured to merge the collected user information with form data that is stored within the database 224 or 424 to populate the form or forms. For instance, where a piece of the user information comprises the user's name, the form generation module 222, 422 can arrange for the user's name to be inserted in a name data field of the form. This association can be, for instance, facilitated by metadata associated with each piece of information.

After the user information has been configured in this manner, the form generation module 222, 422 can initiate the printing process, as indicated in block 514. Where the form generation module 222 is that of the printing device 102, initiation can comprise the delivery of a print command to the print control module 216. Where the form generation module 422 is that of the local computing device 102, initiation can comprise issuance of a print command to the device driver 416 instructing the driver to send a print job to the printing device 102. Depending upon the configuration, this print job can be transmitted to the printing device 102 directly or via the network 108. At this point, flow can return to block 500 at which the form generation module 222, 422 again awaits reading of a data card 112.

Figure 6A:
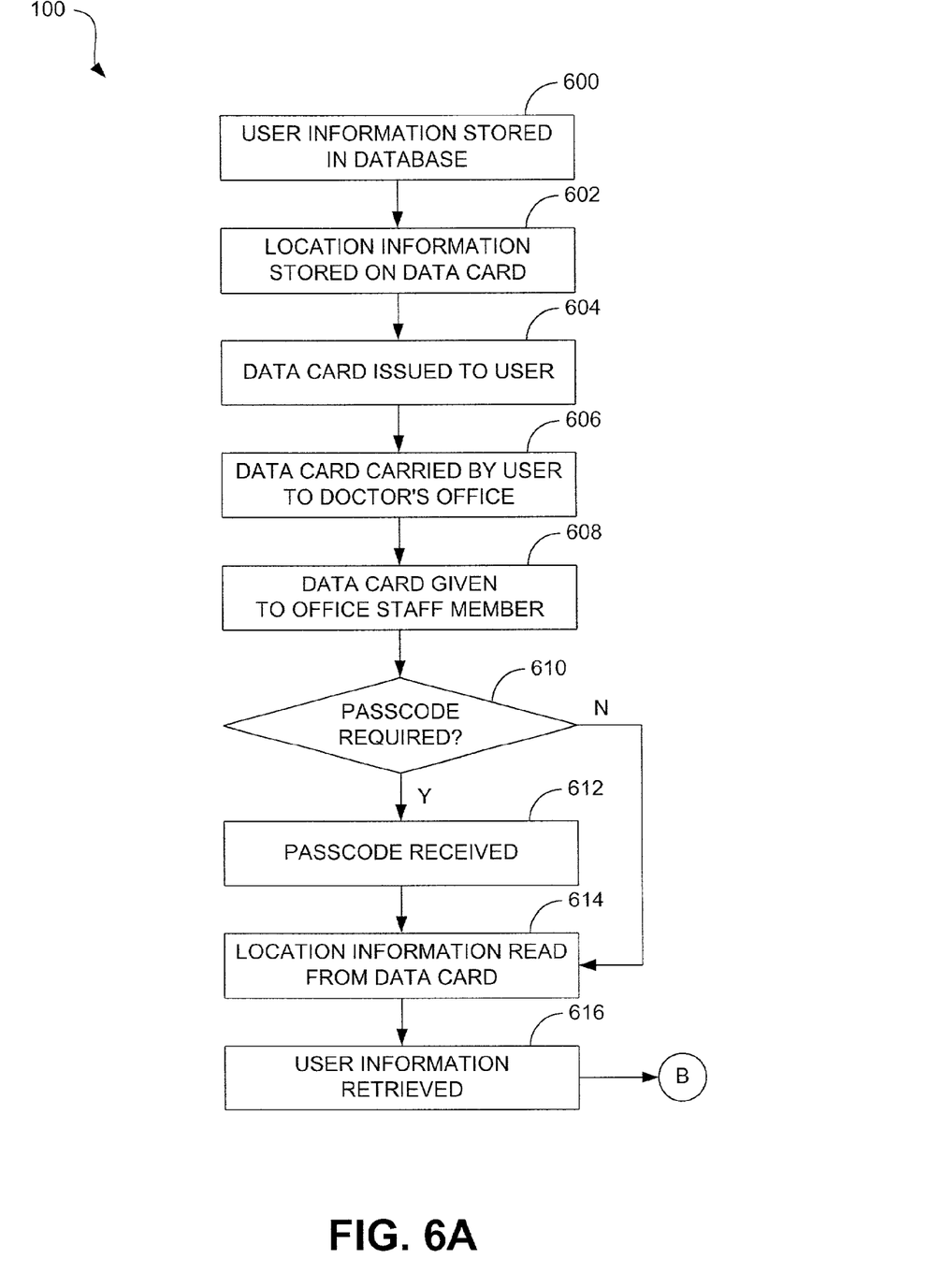
FIGS. 6A and 6B provide a flow diagram that illustrates an example method of use of the system shown in FIG. 1.
Figure 6B:
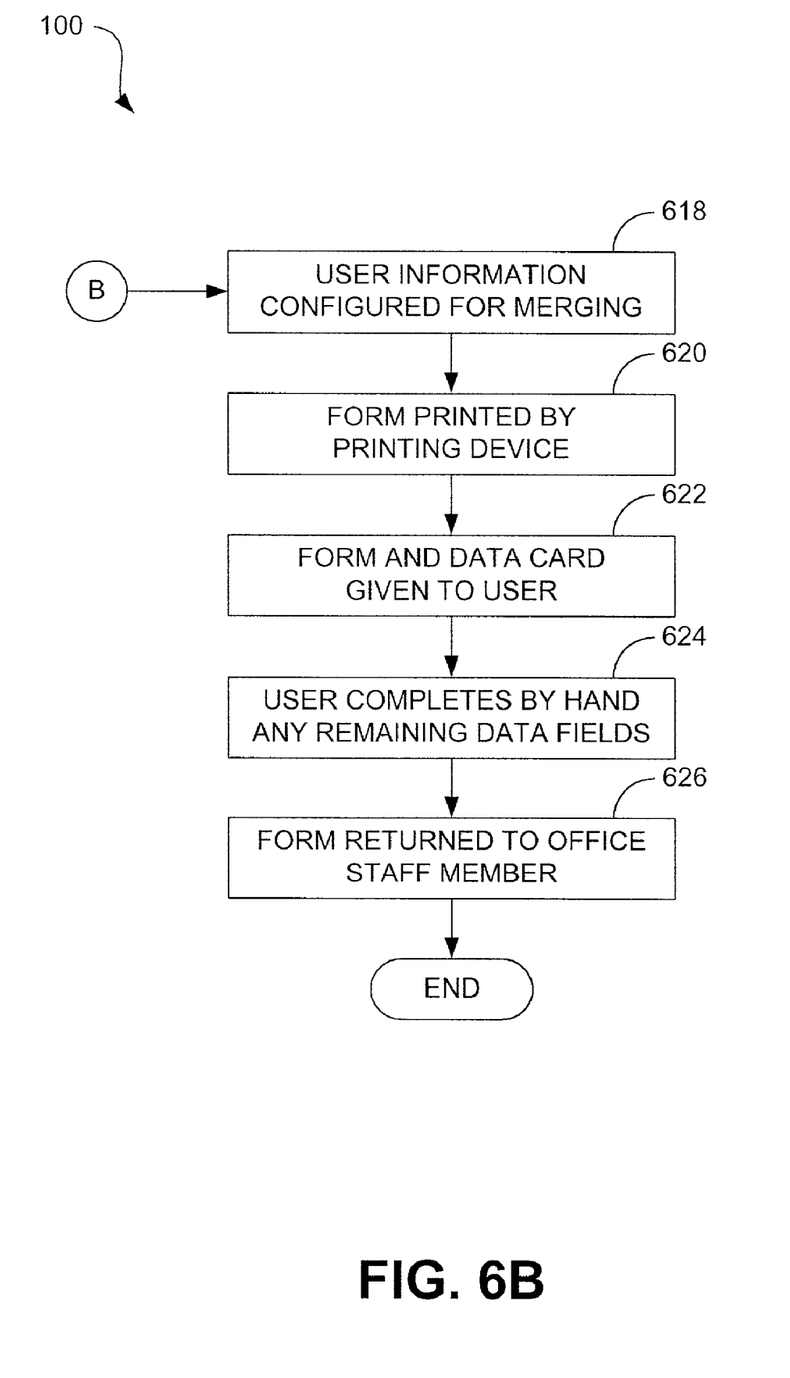

FIGS. 6A and 6B illustrate an example method of use of the system 100 to, at least partially, automate the process of completing a form. In this example, the task of completing a doctor's office form is considered. Although this example is presented in FIGS. 6A and 6B and discussed herein for purposes of illustration, it will be appreciated that the system 100 can be used to complete substantially any form. With reference to block 600 of FIG. 6A, user information is first stored in a database. As discussed above, this database can comprise a database of one or more of the remote computing devices 104. By way of example, the remote computing device 104 can comprise a network server operated by an insurance company that provides medical insurance to the user or operated by an information storage service provider that has been contracted by the insurance company to store this information. Alternatively, the remote computing device 104 can comprise the user's own personal computer on which the user stores personal information that he or she would like to be accessed when completing certain forms.

The user information can be stored with the aid of a software program stored within memory 302 (not identified) which associates particular pieces of information with particular data fields (e.g., with metadata tags). Such a program could present the database administrator with a series of data fields that pertain to particular pieces of information that will likely be needed to complete forms. Accordingly, these fields can, for example, pertain to the user's name, sex, date of birth, social security number, address, telephone number(s), marital status, insurance carrier, insurance subscriber name, insurance group number, applicable medical conditions, current prescriptions, allergies, etc. In addition to static information, the user information can include dynamic (i.e., occasionally and/or frequently updated) information such that up-to-date information can be accessed. For instance, the information can comprise authorization from an insurance company for particular medical visits/procedures, a current amount of a deductible that has been paid, etc.

Once the various user information has been stored, location information pertinent to the location of the stored information can be stored on the data card 112, as indicated in block 602. As identified above, this location information can comprise a URL that can be used to access the user information via the network 108. Storage of this information can be accomplished with a card writer (not shown) whose configuration depends upon the configuration of the data card 112. After the location information has been stored, the data card 112 can be issued to the user, as indicated in block 604. At this point, the card 112 can be carried by the user to his or her doctor's office, as indicated in block 606. Once arriving at the doctor's office, the user can give the card to an office staff member, as indicated in block 608, so that the user information can be retrieved by the office to at least partially automate the form completion process. Once given to the office staff member, the data card 112 can be placed in an appropriate card reader 208, 408 for reading.

As indicated in decision element 610, it can then be determined whether a passcode is required to retrieve the user information. Where a passcode is required, greater security over the user information can be maintained in that the location of the user information will not be shared without entry of the correct passcode. If a passcode is not required, flow continues down to block 614 described below. If a passcode is required, however, flow continues to block 612 at which the passcode is received. By way of example, the passcode can be entered by the user directly into the printing device 102 (e.g., via a control panel) or the local computing device 110 (e.g., via a keyboard), or can be entered into a separate keypad device (not shown) that is operatively coupled to the printing device or local computing device. In any case, the passcode can then be confirmed and flow can continue to block 614 at which the location information is read by the card reader 208, 408.

Once the location information is read, the user information can be retrieved, as indicated in block 616, by visiting the pertinent location and collecting this information. Again, by way of example, this information can be retrieved from a database 314 of one or more of the remote computing devices 104 or the database 424 of the local computing device 110. At this point, flow continues to block 618 of FIG. 6B at which the user information is configured for merging with one or more forms stored locally within the printing device 102 or local computing device 110. After this configuration has been completed, the form or forms can be printed with the printing device 102, as indicated in block 620. The now printed form and the user data card 112 can then be given to the user, as indicated in block 622 and the user can complete any remaining data fields that were not automatically populated by the form generation module 222, 422. Depending upon the amount and nature of user information that was stored in block 600, the user may only need to fill-in a few remaining data fields (e.g., a signature block and date block). At this point, the completed form can be returned to the office staff member, as indicated in block 626, and the user can then wait to see his or her doctor. Flow is then terminated and can be repeated, if necessary, in later office visits.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for completing forms, comprising:
   reading a user data card to determine a network location at which user information to be added to a form is stored;
   retrieving the user information from the network location;
   configuring the user information for merging with the form;
   merging the user information into the form by populating form data fields with pieces of the user information; and
   printing a hard copy form that contains at least a portion of the user information.

2. The method of claim 1, wherein the data card is read by a card reader of a printer that prints the hard copy form such that no separate computer is needed to generate the hard copy form.

3. The method of claim 1, wherein the location information comprises a universal resource locator (URL).

4. The method of claim 1, wherein the network comprises the Internet.

5. The method of claim 1, further comprising confirming authorization to access the user information.

6. The method of claim 5, wherein confirming authorization comprises receiving a correct passcode.

7. A system for completing forms, comprising:
   means for reading location information from a user data card;

means for retrieving user information from a network location identified in the location information;
means for merging the user information with a form; and
means for printing a hard copy form that contains at least a portion of the user information.

8. The system of claim 7, wherein the means for receiving location information comprises a card reader of a printing device, the card reader being adapted to read data from the user data card.

9. The system of claim 7, wherein the means for retrieving the user information comprises a network interface device.

10. The system of claim 9, wherein the network interface device is adapted to transmit and receive data via the Internet.

11. The system of claim 7, wherein the means for printing a hard copy form comprises a printer.

12. A printing device, comprising:
printing hardware included within the printing device with which hard copy documents can be generated;
a card reader provided on the printing device that is adapted to read location information from a user data card;
a network interface device that is adapted to retrieve user information from a network location identified in the location information;
printing device memory that stores forms; and
a form generation module stored in the printing device memory that merges the user information with a form stored in the device memory for the purpose of printing a hard copy form that is at least partially completed.

13. The printing device of claim 12, wherein the card reader is adapted to read information from a magnetic strip of the user data card.

14. The printing device of claim 12, further comprising a network browser.

15. The printing device of claim 14, wherein the network browser is an Internet browser.

16. The printing device of claim 12, wherein the printing device comprises a printer.

17. The printing device of claim 12, wherein the printing device comprises a multifunction peripheral (MFP) device.

* * * * *

UNITED STATES PATENT AND TRADEMARK OFFICE
CERTIFICATE OF CORRECTION

| | | |
|---|---|---|
| PATENT NO. | : 7,185,273 B2 | Page 1 of 1 |
| APPLICATION NO. | : 09/916537 | |
| DATED | : February 27, 2007 | |
| INVENTOR(S) | : Tamra L. Thomason | |

It is certified that error appears in the above-identified patent and that said Letters Patent is hereby corrected as shown below:

In column 6, line 17, delete "(IJRL)" and insert -- (URL) --, therefor.

In column 6, line 18, after "108" delete "50" and insert -- so --, therefor.

Signed and Sealed this

Twelfth Day of May, 2009

JOHN DOLL
*Acting Director of the United States Patent and Trademark Office*